(12) United States Patent
Zha et al.

(10) Patent No.: US 9,675,938 B2
(45) Date of Patent: Jun. 13, 2017

(54) CHEMICAL CLEAN FOR MEMBRANE FILTER

(75) Inventors: Fufang Zha, New South Wales (AU); Zhiyi Cao, New South Wales (AU)

(73) Assignee: Evoqua Water Technologies LLC, Warrendale, PA (US)

( * ) Notice: Subject to any disclaimer, the term of this patent is extended or adjusted under 35 U.S.C. 154(b) by 1711 days.

(21) Appl. No.: 11/912,859

(22) PCT Filed: Apr. 28, 2006

(86) PCT No.: PCT/AU2006/000552
§ 371 (c)(1),
(2), (4) Date: Oct. 26, 2007

(87) PCT Pub. No.: WO2006/116797
PCT Pub. Date: Nov. 9, 2006

(65) Prior Publication Data
US 2008/0203017 A1    Aug. 28, 2008

(30) Foreign Application Priority Data
Apr. 29, 2005  (AU) ............................... 2005902169

(51) Int. Cl.
C02F 1/44 (2006.01)
B01D 65/02 (2006.01)
B01D 61/22 (2006.01)

(52) U.S. Cl.
CPC ............ *B01D 65/02* (2013.01); *B01D 61/22* (2013.01); *B01D 2321/04* (2013.01);
(Continued)

(58) Field of Classification Search
USPC ................................ 210/321, 636, 749, 106
See application file for complete search history.

(56) References Cited

U.S. PATENT DOCUMENTS

| 256,008 A | 4/1882 | Leak |
|---|---|---|
| 285,321 A | 9/1883 | Tams |

(Continued)

FOREIGN PATENT DOCUMENTS

| AU | 34400/84 A | 4/1985 |
|---|---|---|
| AU | 55847/86 A | 9/1986 |

(Continued)

OTHER PUBLICATIONS

"Chemical Cleaning Definition", Lenntech BV, Lenntech Water treatment & purification Holding B.V, Chemical Cleaning.*

(Continued)

*Primary Examiner* — Krishnan S Menon

(57) ABSTRACT

A method of cleaning a porous polymeric membrane having a feed side and a permeate side including the steps of introducing a fluid containing a cleaning agent to the permeate side of a membrane allowing the cleaning agent to contact the permeate side of the membrane for a predetermined time, and contact the pores of the membrane, or introducing a fluid containing a cleaning agent to the feed side of a membrane; applying a transmembrane pressure to force the fluid containing the cleaning agent from the feed side to the permeate side of the membrane; allowing the cleaning agent to contact the permeate side of the membrane for a predetermined time, and contact the pores of the membrane. Preferably a concentration gradient between the feed side fluid and the lumen side fluid containing the cleaning agent causes cleaning agent to diffuse into the feed side fluid. Pressure may be applied to the fluid containing a cleaning agent to dislodge, where present, dissolved and undissolved solid from the membrane pores. The pressure may be applied in a pulsed fashion, and can be by way of compressed air at a pressure not more than the membrane's (Continued)

bubble point. The methods of the present invention may be preceded by, or followed with a backwash.

23 Claims, 6 Drawing Sheets

(52) U.S. Cl.
CPC .......... *B01D 2321/16* (2013.01); *C02F 1/444* (2013.01); *C02F 2303/16* (2013.01)

(56) References Cited

U.S. PATENT DOCUMENTS

| | | |
|---|---|---|
| 511,995 A | 1/1894 | Buckley |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,068,655 A | 12/1962 | Murray et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |
| 3,275,554 A | 9/1966 | Wagenaar |
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A | 4/1970 | Bray |
| 3,556,305 A | 1/1971 | Shorr |
| 3,563,860 A | 2/1971 | Henderyckx |
| 3,591,010 A | 7/1971 | Pall et al. |
| 3,625,827 A | 12/1971 | Wildi et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,843,809 A | 10/1974 | Luck |
| 3,876,738 A | 4/1975 | Marinaccio et al. |
| 3,955,998 A | 5/1976 | Clampitt et al. |
| 3,968,192 A | 7/1976 | Hoffman, III et al. |
| 3,982,095 A | 9/1976 | Robinson |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,138,460 A | 2/1979 | Tigner |
| 4,157,899 A | 6/1979 | Wheaton |
| 4,183,890 A | 1/1980 | Bollinger |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A | 6/1981 | Pollock |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,371,427 A | 2/1983 | Holler et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A * | 9/1985 | Shibata et al. ............. 210/323.2 |
| 4,545,862 A | 10/1985 | Gore et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,830 A | 10/1987 | Makino et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |

(56) References Cited

U.S. PATENT DOCUMENTS

| | | |
|---|---|---|
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,889,620 A | 12/1989 | Schmit et al. |
| 4,904,426 A | 2/1990 | Lundgard et al. |
| 4,908,114 A | 3/1990 | Ayers |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,952,317 A | 8/1990 | Culkin |
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,969,997 A | 11/1990 | Kluver et al. |
| 4,980,066 A | 12/1990 | Slegers |
| 4,988,444 A | 1/1991 | Applegate et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,069,353 A | 12/1991 | Espenan |
| 5,075,044 A | 12/1991 | Augem |
| 5,075,065 A | 12/1991 | Effenberger et al. |
| 5,076,925 A | 12/1991 | Roesink et al. |
| 5,079,272 A | 1/1992 | Allegrezza, Jr. et al. |
| 5,080,770 A | 1/1992 | Culkin |
| 5,094,750 A | 3/1992 | Kopp et al. |
| 5,094,867 A | 3/1992 | Detering et al. |
| 5,098,567 A | 3/1992 | Nishiguchi |
| 5,102,550 A | 4/1992 | Pizzino et al. |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,156,738 A | 10/1992 | Maxson |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,203,405 A | 4/1993 | Gentry et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,248,424 A | 9/1993 | Cote et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A * | 4/1995 | Smith et al. ............. 210/321.69 |
| 5,405,528 A | 4/1995 | Selbie et al. |
| 5,411,663 A | 5/1995 | Johnson |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,482,625 A | 1/1996 | Shimizu et al. |
| 5,484,528 A | 1/1996 | Yagi et al. |
| 5,490,939 A | 2/1996 | Gerigk et al. |
| 5,491,023 A | 2/1996 | Tsai et al. |
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghavan et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soffer et al. |
| 5,597,732 A | 1/1997 | Bryan-Brown |
| 5,607,593 A | 3/1997 | Cote et al. |
| 5,626,755 A | 5/1997 | Keyser et al. |
| 5,629,084 A | 5/1997 | Moya |
| 5,633,163 A | 5/1997 | Cameron |
| 5,639,373 A | 6/1997 | Mahendran et al. |
| 5,643,455 A | 7/1997 | Kopp et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| D396,726 S | 8/1998 | Sadr et al. |
| 5,814,234 A | 9/1998 | Bower et al. |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman |

(56) References Cited

U.S. PATENT DOCUMENTS

| | | | |
|---|---|---|---|
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A * | 9/1999 | Lawrence et al. ............ 210/636 |
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |
| 6,017,451 A | 1/2000 | Kopf |
| 6,024,872 A | 2/2000 | Mahendran et al. |
| 6,036,030 A | 3/2000 | Stone et al. |
| 6,039,872 A | 3/2000 | Wu et al. |
| 6,042,677 A | 3/2000 | Mahendran et al. |
| 6,045,698 A * | 4/2000 | Cote et al. .................... 210/636 |
| 6,045,899 A | 4/2000 | Wang et al. |
| 6,048,454 A | 4/2000 | Jenkins |
| 6,048,455 A | 4/2000 | Janik |
| 6,066,401 A | 5/2000 | Stilburn |
| 6,071,404 A | 6/2000 | Tsui |
| 6,074,718 A | 6/2000 | Puglia et al. |
| 6,077,435 A | 6/2000 | Beck et al. |
| 6,083,393 A | 7/2000 | Wu et al. |
| 6,096,213 A | 8/2000 | Radovanovic et al. |
| 6,113,782 A | 9/2000 | Leonard |
| 6,120,688 A | 9/2000 | Daly et al. |
| 6,126,819 A | 10/2000 | Heine et al. |
| 6,146,747 A | 11/2000 | Wang et al. |
| 6,149,817 A | 11/2000 | Peterson et al. |
| 6,156,200 A | 12/2000 | Zha et al. |
| 6,159,373 A | 12/2000 | Beck et al. |
| 6,162,020 A | 12/2000 | Kondo |
| 6,193,890 B1 | 2/2001 | Pedersen et al. |
| 6,202,475 B1 | 3/2001 | Selbie et al. |
| 6,214,231 B1 | 4/2001 | Cote et al. |
| 6,214,232 B1 | 4/2001 | Baurmeister et al. |
| 6,221,247 B1 | 4/2001 | Nemser et al. |
| 6,245,239 B1 | 6/2001 | Cote et al. |
| 6,254,773 B1 | 7/2001 | Biltoft |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,290,756 B1 | 9/2001 | Macheras et al. |
| 6,294,039 B1 | 9/2001 | Mahendran et al. |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,319,411 B1 | 11/2001 | Cote |
| 6,322,703 B1 | 11/2001 | Taniguchi et al. |
| 6,324,898 B1 | 12/2001 | Cote et al. |
| 6,325,928 B1 | 12/2001 | Pedersen et al. |
| 6,325,938 B1 | 12/2001 | Miyashita et al. |
| 6,331,248 B1 | 12/2001 | Taniguchi et al. |
| 6,337,018 B1 | 1/2002 | Mickols |
| RE37,549 E | 2/2002 | Mahendran et al. |
| 6,349,835 B1 | 2/2002 | Saux et al. |
| 6,354,444 B1 | 3/2002 | Mahendran et al. |
| 6,361,695 B1 | 3/2002 | Husain et al. |
| 6,368,819 B1 | 4/2002 | Gaddy et al. |
| 6,372,138 B1 | 4/2002 | Cho et al. |
| 6,375,848 B1 | 4/2002 | Cote et al. |
| 6,383,369 B2 | 5/2002 | Elston |
| 6,387,189 B1 | 5/2002 | Groschl et al. |
| 6,402,955 B2 | 6/2002 | Ookata |
| 6,406,629 B1 | 6/2002 | Husain et al. |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 | 9/2002 | Onyeche et al. |
| 6,468,430 B1 | 10/2002 | Kimura et al. |
| 6,471,869 B1 | 10/2002 | Yanou et al. |
| 6,485,645 B1 | 11/2002 | Husain et al. |
| 6,495,041 B2 | 12/2002 | Taniguchi et al. |
| 6,517,723 B1 | 2/2003 | Daigger et al. |
| 6,524,481 B2 | 2/2003 | Zha et al. |
| 6,524,733 B1 | 2/2003 | Nonobe |
| 6,550,747 B2 | 4/2003 | Rabie et al. |
| 6,555,005 B1 | 4/2003 | Zha et al. |
| 6,562,237 B1 | 5/2003 | Olaopa |
| 6,576,136 B1 | 6/2003 | De Moel et al. |
| 6,592,762 B2 | 7/2003 | Smith |
| D478,913 S | 8/2003 | Johnson et al. |
| 6,613,222 B2 | 9/2003 | Mikkelson et al. |
| 6,620,319 B2 | 9/2003 | Behmann et al. |
| 6,623,643 B2 | 9/2003 | Chisholm et al. |
| 6,627,082 B2 | 9/2003 | Del Vecchio et al. |
| 6,632,358 B1 | 10/2003 | Suga et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,185 B2 | 3/2004 | Goel et al. |
| 6,706,189 B2 | 3/2004 | Rabie et al. |
| 6,708,957 B2 | 3/2004 | Cote et al. |
| 6,712,970 B1 | 3/2004 | Trivedi |
| 6,721,529 B2 | 4/2004 | Chen et al. |
| 6,723,242 B1 | 4/2004 | Ohkata et al. |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,755,970 B1 | 6/2004 | Knappe et al. |
| 6,758,972 B2 | 7/2004 | Vriens et al. |
| 6,761,826 B2 | 7/2004 | Bender |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,347 B2 | 9/2004 | Jeong et al. |
| 6,790,912 B2 | 9/2004 | Blong |
| 6,805,806 B2 | 10/2004 | Arnaud |
| 6,808,629 B2 | 10/2004 | Wouters-Wasiak et al. |
| 6,811,696 B2 | 11/2004 | Wang et al. |
| 6,814,861 B2 | 11/2004 | Husain et al. |
| 6,821,420 B2 | 11/2004 | Zha et al. |
| 6,830,782 B2 | 12/2004 | Kanazawa |
| 6,840,251 B2 | 1/2005 | Gill et al. |
| 6,841,070 B2 | 1/2005 | Zha et al. |
| 6,861,466 B2 | 3/2005 | Dadalas et al. |
| 6,863,816 B2 | 3/2005 | Austin et al. |
| 6,863,817 B2 | 3/2005 | Liu et al. |
| 6,863,818 B2 | 3/2005 | Daigger et al. |
| 6,863,823 B2 | 3/2005 | Cote |
| 6,869,534 B2 | 3/2005 | McDowell et al. |
| 6,872,305 B2 | 3/2005 | Johnson et al. |
| 6,881,343 B2 | 4/2005 | Rabie et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,812 B2 | 5/2005 | Cote et al. |
| 6,936,085 B2 | 8/2005 | DeMarco |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |

(56) References Cited

U.S. PATENT DOCUMENTS

| | | |
|---|---|---|
| 6,964,741 B2 | 11/2005 | Mahendran et al. |
| 6,969,465 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowell |
| 7,014,763 B2 | 3/2006 | Johnson et al. |
| 7,018,530 B2 | 3/2006 | Pollock |
| 7,018,533 B2 | 3/2006 | Johnson et al. |
| 7,022,233 B2 | 4/2006 | Chen |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,087,173 B2 | 8/2006 | Cote et al. |
| 7,122,121 B1 | 10/2006 | Ji |
| 7,147,777 B1 | 12/2006 | Porteous |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,160,464 B2 | 1/2007 | Lee et al. |
| 7,172,699 B1 | 2/2007 | Trivedi et al. |
| 7,172,701 B2 | 2/2007 | Gaid et al. |
| 7,186,344 B2 | 3/2007 | Hughes |
| 7,208,091 B2 | 4/2007 | Pind et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,264,716 B2 | 9/2007 | Johnson et al. |
| 7,279,100 B2 | 10/2007 | Devine |
| 7,279,215 B2 | 10/2007 | Hester et al. |
| 7,300,022 B2 | 11/2007 | Muller |
| 7,314,563 B2 | 1/2008 | Cho et al. |
| 7,329,344 B2 | 2/2008 | Jordan et al. |
| 7,344,645 B2 | 3/2008 | Beck et al. |
| 7,361,274 B2 | 4/2008 | Lazaredes |
| 7,378,024 B2 | 5/2008 | Bartels et al. |
| 7,387,723 B2 | 6/2008 | Jordan |
| 7,404,896 B2 | 7/2008 | Muller |
| 7,410,584 B2 | 8/2008 | Devine |
| 7,455,765 B2 | 11/2008 | Elefritz et al. |
| 7,481,933 B2 | 1/2009 | Barnes |
| 7,507,274 B2 | 3/2009 | Tonkovich et al. |
| 7,510,655 B2 | 3/2009 | Barnes |
| 7,531,042 B2 | 5/2009 | Murkute et al. |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 2001/0047962 A1 | 12/2001 | Zha et al. |
| 2001/0052494 A1* | 12/2001 | Cote et al. ............ 210/636 |
| 2002/0027111 A1* | 3/2002 | Ando et al. ............ 210/791 |
| 2002/0070157 A1 | 6/2002 | Yamada |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2002/0189999 A1 | 12/2002 | Espenan et al. |
| 2002/0195390 A1 | 12/2002 | Zha et al. |
| 2003/0038080 A1 | 2/2003 | Vriens et al. |
| 2003/0042199 A1 | 3/2003 | Smith |
| 2003/0052055 A1* | 3/2003 | Akamatsu et al. ...... 210/500.23 |
| 2003/0056919 A1 | 3/2003 | Beck ............ 162/199 |
| 2003/0057155 A1 | 3/2003 | Husain et al. |
| 2003/0075495 A1 | 4/2003 | Dannstrom et al. |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0159988 A1 | 8/2003 | Daigger et al. |
| 2003/0178365 A1 | 9/2003 | Zha et al. |
| 2003/0196955 A1 | 10/2003 | Hughes |
| 2003/0226797 A1 | 12/2003 | Phelps |
| 2003/0234221 A1 | 12/2003 | Johnson et al. |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0084369 A1 | 5/2004 | Zha et al. |
| 2004/0108268 A1 | 6/2004 | Liu et al. |
| 2004/0112831 A1 | 6/2004 | Rabie et al. |
| 2004/0139992 A1 | 7/2004 | Murkute et al. |
| 2004/0145076 A1 | 7/2004 | Zha et al. |
| 2004/0149655 A1 | 8/2004 | Petrucco et al. |
| 2004/0154671 A1 | 8/2004 | Martins et al. |
| 2004/0168978 A1 | 9/2004 | Gray |
| 2004/0168979 A1 | 9/2004 | Zha et al. |
| 2004/0173525 A1 | 9/2004 | Hunniford et al. |
| 2004/0178154 A1 | 9/2004 | Zha et al. |
| 2004/0188341 A1 | 9/2004 | Zha et al. |
| 2004/0211726 A1 | 10/2004 | Baig et al. |
| 2004/0217053 A1 | 11/2004 | Zha et al. |
| 2004/0222158 A1 | 11/2004 | Husain et al. |
| 2004/0232076 A1 | 11/2004 | Zha et al. |
| 2004/0238442 A1 | 12/2004 | Johnson et al. |
| 2004/0245174 A1 | 12/2004 | Takayama et al. |
| 2005/0006308 A1 | 1/2005 | Cote et al. |
| 2005/0023219 A1 | 2/2005 | Kirker et al. |
| 2005/0029185 A1 | 2/2005 | Muller |
| 2005/0029186 A1 | 2/2005 | Muller |
| 2005/0032982 A1 | 2/2005 | Muller |
| 2005/0045557 A1 | 3/2005 | Daigger et al. |
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0139538 A1 | 6/2005 | Lazaredes |
| 2005/0184008 A1 | 8/2005 | Schacht et al. |
| 2005/0194305 A1 | 9/2005 | Vido et al. |
| 2005/0194310 A1 | 9/2005 | Yamamoto et al. |
| 2005/0194315 A1 | 9/2005 | Adams et al. |
| 2005/0258098 A1 | 11/2005 | Vincent et al. |
| 2006/0000775 A1 | 1/2006 | Zha et al. |
| 2006/0021929 A1 | 2/2006 | Mannheim et al. |
| 2006/0065596 A1* | 3/2006 | Kent et al. ............ 210/636 |
| 2006/0081533 A1 | 4/2006 | Khudenko |
| 2006/0131234 A1 | 6/2006 | Zha et al. |
| 2006/0201876 A1 | 9/2006 | Jordan |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0261007 A1* | 11/2006 | Zha et al. ............ 210/636 |
| 2006/0273007 A1 | 12/2006 | Zha et al. |
| 2006/0273038 A1 | 12/2006 | Syed et al. |
| 2007/0007205 A1 | 1/2007 | Johnson et al. |
| 2007/0007207 A1 | 1/2007 | Mahendran et al. |
| 2007/0007214 A1 | 1/2007 | Zha et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |
| 2007/0056905 A1 | 3/2007 | Beck et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |

(56) References Cited

U.S. PATENT DOCUMENTS

| | | |
|---|---|---|
| 2007/0108125 A1 | 5/2007 | Cho et al. |
| 2007/0131614 A1 | 6/2007 | Knappe et al. |
| 2007/0138090 A1 | 6/2007 | Jordan et al. |
| 2007/0170112 A1 | 7/2007 | Elefritz et al. |
| 2007/0181496 A1 | 8/2007 | Zuback |
| 2007/0227973 A1 | 10/2007 | Zha et al. |
| 2008/0053923 A1 | 3/2008 | Beck et al. |
| 2008/0093297 A1 | 4/2008 | Gock et al. |
| 2008/0156745 A1 | 7/2008 | Zha et al. |
| 2008/0179249 A1 | 7/2008 | Beck et al. |
| 2008/0190846 A1 | 8/2008 | Cox et al. |
| 2008/0203016 A1 | 8/2008 | Johnson et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2009/0223895 A1 | 9/2009 | Zha et al. |
| 2009/0255873 A1 | 10/2009 | Biltoft et al. |
| 2010/0000941 A1 | 1/2010 | Muller |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300968 A1 | 12/2010 | Liu et al. |
| 2010/0326906 A1 | 12/2010 | Barnes |
| 2011/0023913 A1 | 2/2011 | Fulling |
| 2011/0049047 A1 | 3/2011 | Cumin et al. |
| 2011/0056522 A1 | 3/2011 | Zauner et al. |
| 2011/0100907 A1 | 5/2011 | Zha et al. |
| 2011/0114557 A2 | 5/2011 | Johnson et al. |
| 2011/0127209 A1 | 6/2011 | Rogers et al. |
| 2011/0132826 A1 | 6/2011 | Muller et al. |
| 2011/0139715 A1 | 6/2011 | Zha et al. |
| 2011/0192783 A1 | 8/2011 | Cox et al. |
| 2011/0198283 A1 | 8/2011 | Zha et al. |
| 2012/0074053 A1 | 3/2012 | Collignon et al. |
| 2012/0091602 A1 | 4/2012 | Cumin et al. |
| 2012/0187044 A1 | 7/2012 | Zha et al. |
| 2012/0285885 A1 | 11/2012 | James et al. |
| 2013/0037467 A1 | 2/2013 | Biltoft et al. |
| 2013/0056426 A1 | 3/2013 | Barnes |
| 2013/0153496 A1 | 6/2013 | Zha et al. |

FOREIGN PATENT DOCUMENTS

| | | |
|---|---|---|
| AU | 77066/87 A | 2/1988 |
| AU | 762091 B2 | 6/2003 |
| AU | 2004289373 A1 | 5/2005 |
| CA | 2460207 A1 | 3/2003 |
| CA | 2531764 A1 | 3/2005 |
| CN | 86104888 A | 2/1988 |
| CN | 1050770 | 1/1995 |
| CN | 2204898Y Y | 8/1995 |
| CN | 2236049Y Y | 9/1996 |
| CN | 1159769 A | 9/1997 |
| CN | 1244814 A | 2/2000 |
| CN | 1249698 A | 4/2000 |
| CN | 1265636 A | 9/2000 |
| CN | 1319032 A | 10/2001 |
| CN | 1468140 A | 1/2004 |
| CN | 1541757 A | 11/2004 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 4326603 A1 | 2/1995 |
| DE | 19503060 A1 | 8/1996 |
| DE | 29804927 U1 | 6/1998 |
| DE | 29906389 U1 | 6/1999 |
| DE | 10045227 C1 | 2/2002 |
| DE | 10209170 C1 | 8/2003 |
| DE | 202004012693 U1 | 10/2004 |
| EP | 012557 B1 | 2/1983 |
| EP | 126714 A2 | 11/1984 |
| EP | 050447 B1 | 10/1985 |
| EP | 194735 A2 | 9/1986 |
| EP | 250337 A1 | 12/1987 |
| EP | 327025 A1 | 8/1989 |
| EP | 344633 A1 | 12/1989 |
| EP | 090383 B1 | 5/1990 |
| EP | 407900 A2 | 1/1991 |
| EP | 463627 A2 | 1/1992 |
| EP | 0464321 A1 | 1/1992 |
| EP | 492942 A2 | 7/1992 |
| EP | 518250 B1 | 12/1992 |
| EP | 547575 A1 | 6/1993 |
| EP | 280052 B1 | 7/1994 |
| EP | 395133 B1 | 2/1995 |
| EP | 662341 A1 | 7/1995 |
| EP | 492446 B1 | 11/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 848194 A2 | 6/1998 |
| EP | 855214 A1 | 7/1998 |
| EP | 627255 B1 | 1/1999 |
| EP | 911073 A1 | 4/1999 |
| EP | 920904 A2 | 6/1999 |
| EP | 0937494 A2 | 8/1999 |
| EP | 1034835 A1 | 9/2000 |
| EP | 1052012 A1 | 11/2000 |
| EP | 1156015 A1 | 11/2001 |
| EP | 1300186 A1 | 4/2003 |
| EP | 1349644 B1 | 10/2003 |
| EP | 1350555 A1 | 10/2003 |
| EP | 1236503 B1 | 8/2004 |
| EP | 1445240 | 8/2004 |
| EP | 1466658 A1 | 10/2004 |
| EP | 1659171 A1 | 5/2006 |
| EP | 1420874 B1 | 1/2011 |
| FR | 2620712 A1 | 3/1989 |
| FR | 2674448 A1 | 10/1992 |
| FR | 2699424 A1 | 6/1994 |
| FR | 2762834 A1 | 11/1998 |
| GB | 702911 A | 1/1954 |
| GB | 996195 A | 6/1965 |
| GB | 2253572 A | 9/1992 |
| JP | 52-078677 A | 7/1977 |
| JP | 53108882 A | 9/1978 |
| JP | 54162684 A | 12/1979 |
| JP | 55099703 A | 7/1980 |
| JP | 55129107 A | 10/1980 |
| JP | 55129155 A | 10/1980 |
| JP | 56021604 A | 2/1981 |
| JP | 56118701 A | 9/1981 |
| JP | 56121685 A | 9/1981 |
| JP | 57190697 A | 11/1982 |
| JP | 58088007 A | 5/1983 |
| JP | 60019002 A | 1/1985 |
| JP | 60-206412 A | 10/1985 |
| JP | 60260628 A | 12/1985 |
| JP | 61097005 A | 5/1986 |
| JP | 61097006 A | 5/1986 |
| JP | 61107905 A | 5/1986 |
| JP | 61167406 A | 7/1986 |
| JP | 61167407 A | 7/1986 |
| JP | 61171504 A | 8/1986 |
| JP | 61192309 A | 8/1986 |
| JP | 61222510 A | 10/1986 |
| JP | 61242607 A | 10/1986 |
| JP | 61249505 A | 11/1986 |
| JP | 61257203 A | 11/1986 |
| JP | 61263605 A | 11/1986 |
| JP | 61291007 A | 12/1986 |
| JP | 61293504 A | 12/1986 |
| JP | 62004408 A | 1/1987 |
| JP | 62068828 A | 3/1987 |
| JP | 62114609 A | 5/1987 |
| JP | 62140607 A | 6/1987 |
| JP | 62144708 A | 6/1987 |
| JP | 62163708 A | 7/1987 |
| JP | 62179540 A | 8/1987 |

(56) References Cited

FOREIGN PATENT DOCUMENTS

| | | |
|---|---|---|
| JP | 62237908 A | 10/1987 |
| JP | 62250908 A | 10/1987 |
| JP | 62187606 | 11/1987 |
| JP | 62262710 A | 11/1987 |
| JP | 63-93307 | 4/1988 |
| JP | 63097634 A | 4/1988 |
| JP | 63099246 A | 4/1988 |
| JP | 63143905 A | 6/1988 |
| JP | 63-1602 | 7/1988 |
| JP | 63171607 A | 7/1988 |
| JP | 63180254 A | 7/1988 |
| JP | S63-38884 | 10/1988 |
| JP | 64-075542 A | 3/1989 |
| JP | 1-501046 T | 4/1989 |
| JP | 1111494 A | 4/1989 |
| JP | 01151906 A | 6/1989 |
| JP | 01-307409 A | 12/1989 |
| JP | 02-017925 | 1/1990 |
| JP | 02017924 | 1/1990 |
| JP | 02026625 A | 1/1990 |
| JP | 02031200 A | 2/1990 |
| JP | 02040296 A | 2/1990 |
| JP | 02107318 A | 4/1990 |
| JP | 02126922 A | 5/1990 |
| JP | 02144132 A | 6/1990 |
| JP | 02164423 A | 6/1990 |
| JP | 02174918 A | 7/1990 |
| JP | 02241523 A | 9/1990 |
| JP | 02277528 A | 11/1990 |
| JP | 02284035 A | 11/1990 |
| JP | 03018373 A | 1/1991 |
| JP | 03028797 A | 2/1991 |
| JP | 03-086529 A | 4/1991 |
| JP | 03110445 A | 5/1991 |
| JP | 04108518 A | 4/1992 |
| JP | 04110023 A | 4/1992 |
| JP | 4-190889 A | 7/1992 |
| JP | 04187224 A | 7/1992 |
| JP | 4-256425 A | 9/1992 |
| JP | 04250898 A | 9/1992 |
| JP | 04256424 A | 9/1992 |
| JP | 04265128 A | 9/1992 |
| JP | 04293527 A | 10/1992 |
| JP | 04310223 A | 11/1992 |
| JP | 04317793 A | 11/1992 |
| JP | 04334530 A | 11/1992 |
| JP | 04348252 A | 12/1992 |
| JP | 05023557 A | 2/1993 |
| JP | 05096136 A | 4/1993 |
| JP | 05137977 A | 6/1993 |
| JP | 05157654 A | 6/1993 |
| JP | 05161831 A | 6/1993 |
| JP | 05184884 A | 7/1993 |
| JP | 05279447 A | 10/1993 |
| JP | 05285348 A | 11/1993 |
| JP | 05305221 A | 11/1993 |
| JP | 06-027215 A | 2/1994 |
| JP | 06071120 A | 3/1994 |
| JP | 06114240 A | 4/1994 |
| JP | 06170364 A | 6/1994 |
| JP | 06190250 A | 7/1994 |
| JP | 06218237 A | 8/1994 |
| JP | 06238273 A | 8/1994 |
| JP | 06-292820 A | 10/1994 |
| JP | 06277469 A | 10/1994 |
| JP | 06285496 A | 10/1994 |
| JP | 06343837 A | 12/1994 |
| JP | 07000770 A | 1/1995 |
| JP | 07024272 A | 1/1995 |
| JP | 07047247 A | 2/1995 |
| JP | 07068139 A | 3/1995 |
| JP | 07136470 A | 5/1995 |
| JP | 07136471 A | 5/1995 |
| JP | 07155564 A | 6/1995 |
| JP | 07155758 A | 6/1995 |
| JP | 7-39921 | 7/1995 |
| JP | 07178323 A | 7/1995 |
| JP | 07185268 A | 7/1995 |
| JP | 07185270 A | 7/1995 |
| JP | 07185271 A | 7/1995 |
| JP | 07185272 A | 7/1995 |
| JP | 07204635 A | 8/1995 |
| JP | 07236819 A | 9/1995 |
| JP | 07-256253 | 10/1995 |
| JP | 07251043 A | 10/1995 |
| JP | 07275665 A | 10/1995 |
| JP | 07289860 A | 11/1995 |
| JP | 07303895 A | 11/1995 |
| JP | 07313973 A | 12/1995 |
| JP | 08010585 A | 1/1996 |
| JP | 8039089 A | 2/1996 |
| JP | 08-197053 A | 8/1996 |
| JP | 08323161 A | 12/1996 |
| JP | 08332357 A | 12/1996 |
| JP | 09000890 A | 1/1997 |
| JP | 09038470 A | 2/1997 |
| JP | 09038648 A | 2/1997 |
| JP | 09-075689 A | 3/1997 |
| JP | 09072993 A | 3/1997 |
| JP | 09099227 A | 4/1997 |
| JP | 09103655 A | 4/1997 |
| JP | 9103661 A | 4/1997 |
| JP | 9117647 A | 5/1997 |
| JP | 9138298 A | 5/1997 |
| JP | 09141063 A | 6/1997 |
| JP | 09155345 A | 6/1997 |
| JP | 09187628 A | 7/1997 |
| JP | 09192458 A | 7/1997 |
| JP | 09220569 A | 8/1997 |
| JP | 09271641 A | 10/1997 |
| JP | 09-313902 A | 12/1997 |
| JP | 09324067 A | 12/1997 |
| JP | 10-015365 A | 1/1998 |
| JP | 10024222 A | 1/1998 |
| JP | 10033955 A | 2/1998 |
| JP | 10048466 A | 2/1998 |
| JP | 10066972 A | 3/1998 |
| JP | 10076144 A | 3/1998 |
| JP | 10076264 A | 3/1998 |
| JP | 10085562 A | 4/1998 |
| JP | 10085565 A | 4/1998 |
| JP | 10085566 A | 4/1998 |
| JP | 10156149 A | 6/1998 |
| JP | 10180048 A | 7/1998 |
| JP | 10225685 A | 8/1998 |
| JP | 10235168 A | 9/1998 |
| JP | 10249171 A | 9/1998 |
| JP | 10286441 A | 10/1998 |
| JP | 10328538 A | 12/1998 |
| JP | 11005023 A | 1/1999 |
| JP | 11028339 A | 2/1999 |
| JP | 11028467 A | 2/1999 |
| JP | 11031025 A | 2/1999 |
| JP | 11033365 A | 2/1999 |
| JP | 11033367 A | 2/1999 |
| JP | 11076769 A | 3/1999 |
| JP | 11076770 A | 3/1999 |
| JP | 11090189 A | 4/1999 |
| JP | 11156166 A | 6/1999 |
| JP | 11156360 A | 6/1999 |
| JP | 11165200 A | 6/1999 |
| JP | 11-179171 A | 7/1999 |
| JP | 11300177 A | 11/1999 |
| JP | 11302438 A | 11/1999 |
| JP | 11309351 A | 11/1999 |
| JP | 11319501 A | 11/1999 |
| JP | 11319507 A | 11/1999 |
| JP | 11333265 A | 12/1999 |
| JP | 2000000439 A | 1/2000 |
| JP | 200051670 | 2/2000 |
| JP | 2000051669 A | 2/2000 |
| JP | 2000061466 A | 2/2000 |
| JP | 200079390 A | 3/2000 |
| JP | 2000070684 A | 3/2000 |

(56) References Cited

FOREIGN PATENT DOCUMENTS

| | | |
|---|---|---|
| JP | 2000-093758 | 4/2000 |
| JP | 2000-157845 | 6/2000 |
| JP | 2000157850 A | 6/2000 |
| JP | 2000185220 A | 7/2000 |
| JP | 2000189958 A | 7/2000 |
| JP | 2000233020 A | 8/2000 |
| JP | 2000237548 A | 9/2000 |
| JP | 2000300968 A | 10/2000 |
| JP | 2000317276 A | 11/2000 |
| JP | 2000-334276 A | 12/2000 |
| JP | 2000342932 A | 12/2000 |
| JP | 2001009246 A | 1/2001 |
| JP | 2001070967 A | 3/2001 |
| JP | 2001079366 A | 3/2001 |
| JP | 2001079367 A | 3/2001 |
| JP | 2001104760 A | 4/2001 |
| JP | 2001120963 A | 5/2001 |
| JP | 2001-510396 T | 7/2001 |
| JP | 2001179059 A | 7/2001 |
| JP | 2001179060 A | 7/2001 |
| JP | 2001190937 A | 7/2001 |
| JP | 2001190938 A | 7/2001 |
| JP | 2001205055 A | 7/2001 |
| JP | 2001212587 A | 8/2001 |
| JP | 2001232160 A | 8/2001 |
| JP | 2001-269546 | 10/2001 |
| JP | 2002011472 | 1/2002 |
| JP | 2002143849 A | 5/2002 |
| JP | 2002177746 A | 6/2002 |
| JP | 3302992 B2 | 7/2002 |
| JP | 2002-527229 A | 8/2002 |
| JP | 2002525197 T | 8/2002 |
| JP | 2002263407 A | 9/2002 |
| JP | 2002-336663 | 11/2002 |
| JP | 2003024751 | 1/2003 |
| JP | 2003047830 A | 2/2003 |
| JP | 2003053157 A | 2/2003 |
| JP | 2003053160 A | 2/2003 |
| JP | 200371254 A | 3/2003 |
| JP | 2003062436 A | 3/2003 |
| JP | 2003135935 A | 5/2003 |
| JP | 2003190976 A | 7/2003 |
| JP | 2003-265597 | 9/2003 |
| JP | 2003-275548 A | 9/2003 |
| JP | 2003266072 A | 9/2003 |
| JP | 2003275759 A | 9/2003 |
| JP | 2003340250 A | 12/2003 |
| JP | 2004-008981 | 1/2004 |
| JP | 2004073950 A | 3/2004 |
| JP | 2004-230287 A | 8/2004 |
| JP | 2004216263 A | 8/2004 |
| JP | 2004230280 A | 8/2004 |
| JP | 2004249168 A | 9/2004 |
| JP | 2004322100 A | 11/2004 |
| JP | 2004-536710 A | 12/2004 |
| JP | 2004337730 A | 12/2004 |
| JP | 2005-502467 A | 1/2005 |
| JP | 2005-087887 A | 4/2005 |
| JP | 2005144291 A | 6/2005 |
| JP | 2005154551 A | 6/2005 |
| JP | 2005279447 A | 10/2005 |
| JP | 2006-116495 | 5/2006 |
| JP | 2007-547083 | 8/2010 |
| JP | 4833353 | 12/2011 |
| JP | 4833353 B2 | 12/2011 |
| KR | 1020020067227 | 8/2002 |
| KR | 2002-0090967 | 12/2002 |
| KR | 2003-033812 | 5/2003 |
| KR | 2003-060625 | 7/2003 |
| KR | 2005-063478 | 6/2005 |
| NL | 1006390 C2 | 12/1998 |
| NL | 1020491 | 10/2003 |
| NL | 1021197 | 10/2003 |
| NO | 20053769 A | 2/2006 |
| NZ | 510394 A | 5/2003 |
| NZ | 537874 A | 2/2007 |
| TW | 347343 | 12/1998 |
| WO | 8501449 A1 | 4/1985 |
| WO | 8605116 A1 | 9/1986 |
| WO | 8605705 A1 | 10/1986 |
| WO | 8800494 A1 | 1/1988 |
| WO | 8801529 A1 | 3/1988 |
| WO | 8801895 A1 | 3/1988 |
| WO | 8806200 A1 | 8/1988 |
| WO | 8900880 A1 | 2/1989 |
| WO | 9000434 A1 | 1/1990 |
| WO | 9104783 A1 | 4/1991 |
| WO | 9116124 A1 | 10/1991 |
| WO | 9302779 A1 | 2/1993 |
| WO | 9315827 A1 | 8/1993 |
| WO | 9323152 A1 | 11/1993 |
| WO | 9411094 A1 | 5/1994 |
| WO | 9511736 A1 | 5/1995 |
| WO | 9534424 A1 | 12/1995 |
| WO | 9603202 A1 | 2/1996 |
| WO | 9607470 A1 | 3/1996 |
| WO | 9628236 A1 | 9/1996 |
| WO | 9629142 A1 | 9/1996 |
| WO | 9641676 A1 | 12/1996 |
| WO | 9706880 A2 | 2/1997 |
| WO | 9822204 A1 | 5/1998 |
| WO | 9825694 A1 | 6/1998 |
| WO | 9828066 A1 | 7/1998 |
| WO | 9853902 A1 | 12/1998 |
| WO | 9901207 A1 | 1/1999 |
| WO | 99-55448 A1 | 11/1999 |
| WO | 9959707 A1 | 11/1999 |
| WO | 0018498 A1 | 4/2000 |
| WO | 0030742 A1 | 6/2000 |
| WO | 0100307 A2 | 1/2001 |
| WO | 0105715 A1 | 1/2001 |
| WO | 0108790 A1 | 2/2001 |
| WO | 0119414 A1 | 3/2001 |
| WO | 0132299 A1 | 5/2001 |
| WO | 0136075 A1 | 5/2001 |
| WO | 0143856 A1 | 6/2001 |
| WO | 0145829 A1 | 6/2001 |
| WO | 0226363 A2 | 4/2002 |
| WO | 0230550 A1 | 4/2002 |
| WO | 0240140 A1 | 5/2002 |
| WO | 0247800 A1 | 6/2002 |
| WO | 03000389 A2 | 1/2003 |
| WO | 03013706 A1 | 2/2003 |
| WO | 03024575 A1 | 3/2003 |
| WO | 03053552 A1 | 7/2003 |
| WO | 03057632 A1 | 7/2003 |
| WO | 03059495 A1 | 7/2003 |
| WO | 03068374 A1 | 8/2003 |
| WO | 03095078 A1 | 11/2003 |
| WO | 2004018084 A1 | 3/2004 |
| WO | WO2004024304 A | 3/2004 ............ B01D 65/02 |
| WO | 2004033078 A1 | 4/2004 |
| WO | 2004050221 A1 | 6/2004 |
| WO | 2004056458 A3 | 7/2004 |
| WO | 2004078327 A1 | 9/2004 |
| WO | 2004101120 A1 | 11/2004 |
| WO | 2005005028 A1 | 1/2005 |
| WO | 2005021140 A1 | 3/2005 |
| WO | 2005028085 A1 | 3/2005 |
| WO | 2005028086 A1 | 3/2005 |
| WO | 2005037414 A1 | 4/2005 |
| WO | 2005046849 A1 | 5/2005 |
| WO | 2005077499 A1 | 8/2005 |
| WO | 2005082498 A1 | 9/2005 |
| WO | 2005107929 A2 | 11/2005 |
| WO | 2006026814 A1 | 3/2006 |
| WO | 2006029456 A1 | 3/2006 |
| WO | 2006029465 | 3/2006 |
| WO | 2006047814 A1 | 5/2006 |
| WO | 2006066350 A1 | 6/2006 |
| WO | 2007053528 A2 | 5/2007 |
| WO | 2007065956 A1 | 6/2007 |
| WO | 2007135087 A1 | 11/2007 |
| WO | 2008025077 A1 | 3/2008 |

(56) References Cited

FOREIGN PATENT DOCUMENTS

| | | |
|---|---|---|
| WO | 2008034570 A1 | 3/2008 |
| WO | 2008071516 A1 | 6/2008 |
| WO | 2008141080 A1 | 11/2008 |
| WO | 2008153818 A1 | 12/2008 |
| WO | 2009030405 A1 | 3/2009 |

OTHER PUBLICATIONS

International Search Report dated Jul. 25, 2006 for Application No. PCT/AU2006/000552.
Almulla et al., Desalination, 153 (2002), pp. 237-243.
Anonymous, "Nonwoven Constructions of Dyneon" THV and Dyneon "The Fluorothermoplastics", Research Disclosure Journal, Apr. 1999, RD 420013, 2 pages.
Cote et al., Wat. Sci. Tech. 38(4-5) (1998), pp. 437-442.
Cote, et al. "A New Immersed Membrane for Pretreatment to Reverse Osmosis" Desalination 139 (2001) 229-236.
Crawford et al., "Procurement of Membrane Equipment: Differences Between Water Treatment and Membrane Bioreactor (MBR) Applications" (2003).
Davis et al., Membrane Technology Conference, "Membrane Bioreactor Evaluation for Water Reuse in Seattle, Washington" (2003).
DeCarolis et al., Membrane Technology Conference, "Optimization of Various MBR Systems for Water Reclamation" (2003).
Delgrange-Vincent, N. et al., Desalination 131 (2000) 353-362.
Dow Chemicals Company, "Filmtec Membranes—Cleaning Procedures for Filmtec FT30 Elements," Tech Facts, Online, Jun. 30, 2000, XP002237568.
Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.
Johnson, "Recent Advances in Microfiltration for Drinking Water Treatment," AWWA Annual Conference, Jun. 20-24, 1999, Chicago, Illinois, entire publication.
Jones, Craig, "Applications of Hydrogen Peroxide and Derivatives," The Royal Society of Chemistry, Cambridge, UK 1999 Chapters 2 and 5.
Kaiya et al., "Water Purification Using Hollow Fiber Microfiltration Membranes," 6th World Filtration Congress, Nagoya, 1993, pp. 813-816.
Kang et al. "Characteristics of microfiltration membranes in a membrane coupled sequencing batch reactor system" Water Research, Elsevier, Amsterdam, NL, vol. 37, No. 5, Mar. 2003.
Lloyd, D.R. et al. "Microporous Membrane Formation Via Thermally Induced Phase Separation/Solid-Liquid Phase Separation" Journal of Membrane Science (Sep. 15, 1990), pp. 239-261, vol. 52, No. 3, Elsevier Scientific Publishing Company, Amsterdam, NL.
Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.
Mark et al., "Peroxides and Peroxy Compounds, Inorganic" Kirk—Othmer Encyclopedia of Chemical Technology, Peroxides and Peroxy Compounds, Inorganic, to Piping Systems, New York, Wiley & Sons, Ed., Jan. 1, 1978, pp. 14-18.
MicroCTM—Carbon Source for Wastewater Denitrification. Information from Environmental Operating Solutions website including MSDS.
Nakayama, "Introduction to Fluid Mechanics," Butterworth-Heinemann, Oxford, UK, 2000.
Ramaswammy S. et al. "Fabrication of Ply (ECTFE) Membranes via thermally induced phase Separation", Journal of Membrane Science, (Dec. 1, 2002), pp. 175-180, vol. 210 No. 1, Scientific Publishing Company, Amsterdam, NL.
Rosenberger et al., Desalination, 151 (2002), pp. 195-200.
U.S. Appl. No. 60/278,007, filed Mar. 23, 2001.
Ueda et al., "Effects of Aeration on Suction Pressure in a Submerged Membrane Bioreactor," Wat. Res. vol. 31, No. 3, 1997, pp. 489-494.
Water Encyclopedia, edited by Jay Lehr, published by John Wiley & Sons, Inc., Hoboken, New Jersey, 2005. Available at http://wwwmmrw.interscience.wiley.com/eow/.
Webster's Ninth New Collegiate Dictionary, Merriam-Webster Inc., Publishers, Springfield, Massachusetts, USA, Copyright 1986, p. 1298.
White et al., The Chemical Engineering Journal, 52 (1993), pp. 73-77.
Wikipedia, "Seawater," available at http://en.wikipedia.org/wiki/Seawater, Jul. 15, 2007.
Yamamoto et al., Water Science Technology, vol. 2, pp. 43-54; 1989.
Yoon: "Important operational parameters of membrane bioreactor-sludge disintegration (MBR-SD) system for zero excess sludge production" Water Research, Elsevier, Amsterdam, NL, vol. 37, No. 8, Apr. 2003.
Zenon, "Proposal for ZeeWeed® Membrane Filtration Equipment System for the City of Westminster, Colorado, Proposal No. 479-99," Mar. 2000, entire publication.
Cui et al., "Airlift crossflow membrane filtration—a feasibility study with dextran ultrafiltration," J. Membrane Sci. (1997) vol. 128, pp. 83-91.
Japanese Office Action dated Apr. 3, 2012 for Application No. 2008-508024.
Supplementary European Search Report dated Feb. 8, 2011 for Application No. EP 06 72 1432.
Coulson et al., "Coulson and Richardson's Chemical Engineering," 1999, vol. 1, pp. 358-364.
European Examination Report dated Apr. 9, 2013 for Application No. EP 06 72 1432.

* cited by examiner (b). Solution transport to shell side via membrane pores. (during soaking period, lumen vent valve opened intermittently or continuously)

(a) Feed to lumen side

CHEMICAL CLEAN FOR MEMBRANE FILTER

CROSS REFERENCE TO RELATED APPLICATIONS

This application is a U.S. national stage application and claims the benefit under 35 U.S.C. §371 of International Application No. PCT/AU2006/000552 filed on Apr. 28, 2006, entitled CHEMICAL CLEAN FOR MEMBRANE FILTER, which is based on Australian Patent Application No. 2005902169 filed on Apr. 29, 2005, entitled MAINTENANCE CLEAN FOR MEMBRANE FILTER, each of which is entirely incorporated herein by reference for all purposes, and to which this application claims the benefit of priority.

FIELD OF THE INVENTION

The invention relates to methods of cleaning suitable for use in filtration apparatus. More particularly, the invention relates to methods of cleaning microfiltration or ultrafiltration membranes used for water filtration purposes.

BACKGROUND ART

Microfiltration and ultrafiltration membrane filters are increasingly used in municipal drinking water treatment and wastewater treatment. With a typical microfiltration or ultrafiltration operation, transmembrane pressure (TMP) is the main driving force for the filtration process. As the process progresses and filtered water permeates through the membrane, most of the solid contaminants are retained either on the membrane surface, forming a fouling layer or as plugs in the membrane pores blocking filtration. The presence of a fouling layer or plugged pores or both can significantly increase the transmembrane pressure and ultimately the filtration energy consumption.

Frequent backwashes with either filtrate or gas can partially reclaim the membrane permeability, however, with these methods it is known that foulants may continue to build up on the membrane surface and in the pores. Successive backwashes do not remove all the deposited material, and consequently over time there is deterioration in filter permeability.

Cleaning protocols supplemented by the use of chemical cleaning agents are known. The general criteria for selecting a chemical cleaning method are firstly to achieve a good recovery of membrane permeability, secondly to minimise the amount of chemical cleaning agent required and the resultant amount of waste generated and thirdly to allow ease of operation.

One cleaning method involves immersing the membranes in a chemical cleaning solution for a period of time. The chemical reactions dissolve the solids accumulated on the membrane surface and plugged in the pores. The cleaning effect may be facilitated by injecting air to scour membranes or by recirculating the chemical solution. This is a common method currently used for full chemical recovery of membrane performance, however it suffers from the drawback that a significant volume of chemical solution is required and the process generates large volumes of chemical waste.

In other attempts to control permeability deterioration, short chemical cleans (maintenance cleans) are frequently carried out with membrane filters. U.S. Pat. No. 5,403,479 describes one such method of carrying out such a process. A cleaning solution is introduced into the lumen of a hollow fibre membrane, and recirculated at low flow at a pressure below the membrane bubble point. The cleaning solution permeates through membrane pores under low transmembrane pressure and at a low rate. The authors also indicate that diffusion of cleaning solution through membrane may occur even when fluid is held in the fibres at no velocity but under pressure. During the course of cleaning, the membrane is immersed in water. This method requires storage of a volume of chemical solution sufficient to fill the permeate lines and for recirculation. During the recirculation process, an increasing amount of chemical solution penetrates through the membrane pores from the lumen side to the feed side.

Another method of conducting a membrane clean involves repeatedly backpulsing membranes with a chemical cleaner, as described in JP09313902 and U.S. Pat. No. 6,045,698. Similar methods of chemical cleaning backwash methods for submerged membrane systems are disclosed in US Patent applications 20010052494A1, 20030146153A1, 20040007525A1, PCT application WO0108790A1 and U.S. Pat. No. 6,547,968. Chemical cleaning backwash can be continuous or pulsed, and can be carried out after the membrane tank is drained, while the membrane tank is draining, or even without draining the membrane tank prior to the chemical backwashes. The chemical solution is delivered to the system via a header at the top of the membranes by pump when the membranes are oriented vertically. The chemical cleaning solution is forced under pressure through the membranes to the lumen side. Repeated backpulses may bring the biofilm in the permeate lines back to membranes.

The second and third methods mentioned above generally use less volume of chemical solution than the first method, but they require that the chemical solution be of very high quality and free of solids because the solution is introduced into the permeate side.

It is an object of the present invention to overcome or ameliorate at least one of the disadvantages of the prior art, or to provide a useful alternative.

DESCRIPTION OF THE INVENTION

According to a first aspect the invention provides a method of cleaning a porous polymeric membrane having a feed side and a permeate side including the steps of: introducing a fluid containing a cleaning agent to the permeate side of a membrane; allowing the cleaning agent to contact the permeate side of the membrane for a predetermined time, and contact the pores of the membrane.

Preferably the cleaning agent contacts the permeate side under static pressure.

According to a second aspect the invention provides a method of cleaning a porous polymeric membrane having a feed side and a permeate side including the steps of:

introducing a fluid containing a cleaning agent to the feed side of a membrane;

applying a transmembrane pressure to force the fluid containing the cleaning agent from the feed side to the permeate side of the membrane;

allowing the cleaning agent to contact the permeate side of the membrane for a predetermined time, and contact the pores of the membrane.

Preferably, the transmembrane pressure is a small differential pressure.

According to a third aspect the invention provides a method of cleaning a porous polymeric membrane having a feed side and a permeate side including the steps of:

providing a feed side fluid in contact with the feed side of the membrane;

introducing a fluid containing a cleaning agent to the permeate side of a membrane;

allowing the cleaning agent to contact the permeate side of the membrane for a predetermined time to contact the pores of the membrane and diffuse into the feed side fluid.

Preferably, the solution diffusion in this aspect of the invention is driven by a concentration gradient between the feed side fluid preferably low in concentration of cleaning agent) and the lumen side fluid containing the cleaning agent. Most preferably, the feed side fluid contains no cleaning agent.

Preferably, the methods of the present invention further include the step of applying a pressure to the fluid containing a cleaning agent on the permeate side to dislodge, where present, dissolved and undissolved solid from the membrane pores. More preferably, such pressure is applied in a pulsed fashion. In one particularly preferred embodiment, the source of pressure is compressed air at a pressure not more than the membrane's bubble point.

Preferably, the methods of the present invention are all preceded by a backwash.

Preferably, the methods of the present invention are also followed by a backwash prior to the recommencement of filtration.

If necessary, the methods of the present invention may be repeated in cycles.

The cleaning methods described in this invention can be applied to pressurized membrane filtration or immersed membrane filtration systems. The membranes can be microfiltration, ultrafiltration or nanofiltration membrane, and can be either capillary or flatsheet membrane.

Preferably, the membrane is an ultrafiltration or microfiltration membrane.

In preferred embodiments, the membranes of the present invention are hollow fibre membranes, having a lumen side (permeate side) and a module or shell side (feed side), a plurality of which are housed inside a module housing.

Most preferably, a plurality of the membranes is arranged in aligned bundles. The modules are potted at the ends of the bundles, creating a plurality of lumen spaces inside the hollow fibres and a contiguous space on the outer or shell side of the hollow fibres. The lumens are arranged so that filtered water accumulates therein and is passed from the plurality of lumens into a combined filtration stream.

The fluid may be water.

In the first and third aspects, the fluid containing a cleaning agent is introduced to the lumens of these hollow fibre membranes. In the second aspect, the fluid containing a cleaning agent is introduced to the shell side of the membrane, preferably by partially filling the shell side of the module before being transported into the lumens.

Preferably, the fluid containing the diffusible cleaning agent is retained in the membrane permeate side without applied pressure or slight pressure, approximately equal to the static head pressure may be applied.

The cleaning solution can be any conventional cleaning solution, either acidic, basic or neutral, or can be oxidative or reductive depending upon the origin of the foulant. The cleaning agent can also inorganic or organic. Preferred cleaning agents include dissolved halogens, such as chlorine, or dissolved oxidative or reductive agents, for example sulfite based reagents. Alternatively, cleaning agents may be chelating agents, such as citric acid or EDTA. To facilitate the wetting out and dissolving the foulant, a small amount of surfactant may be added to the cleaning solution.

In a membrane system, the preference on delivery of chemical cleaner varies according to the system design. For example, in some membrane filtration systems it is preferable that chemical cleaner be delivered to the feed side of the membrane. If so, the requirement on the water used to prepare the chemical solution in terms of solid content is not particularly stringent and the cleaning solution may be re-used for several times. This, however, may require a chemical storage tank and a chemical transfer pump. This delivery method is commonly found in large membrane systems. In other membrane systems, it is preferable to deliver the chemical cleaner to the permeate side to further reduce the volume of chemical solution and improve ease of operation. A dosing pump may be used in such circumstances. The methods of the present invention are adapted to handle either feed side or lumen side dosing.

BEST METHOD OF PERFORMING THE INVENTION

Figure 1:
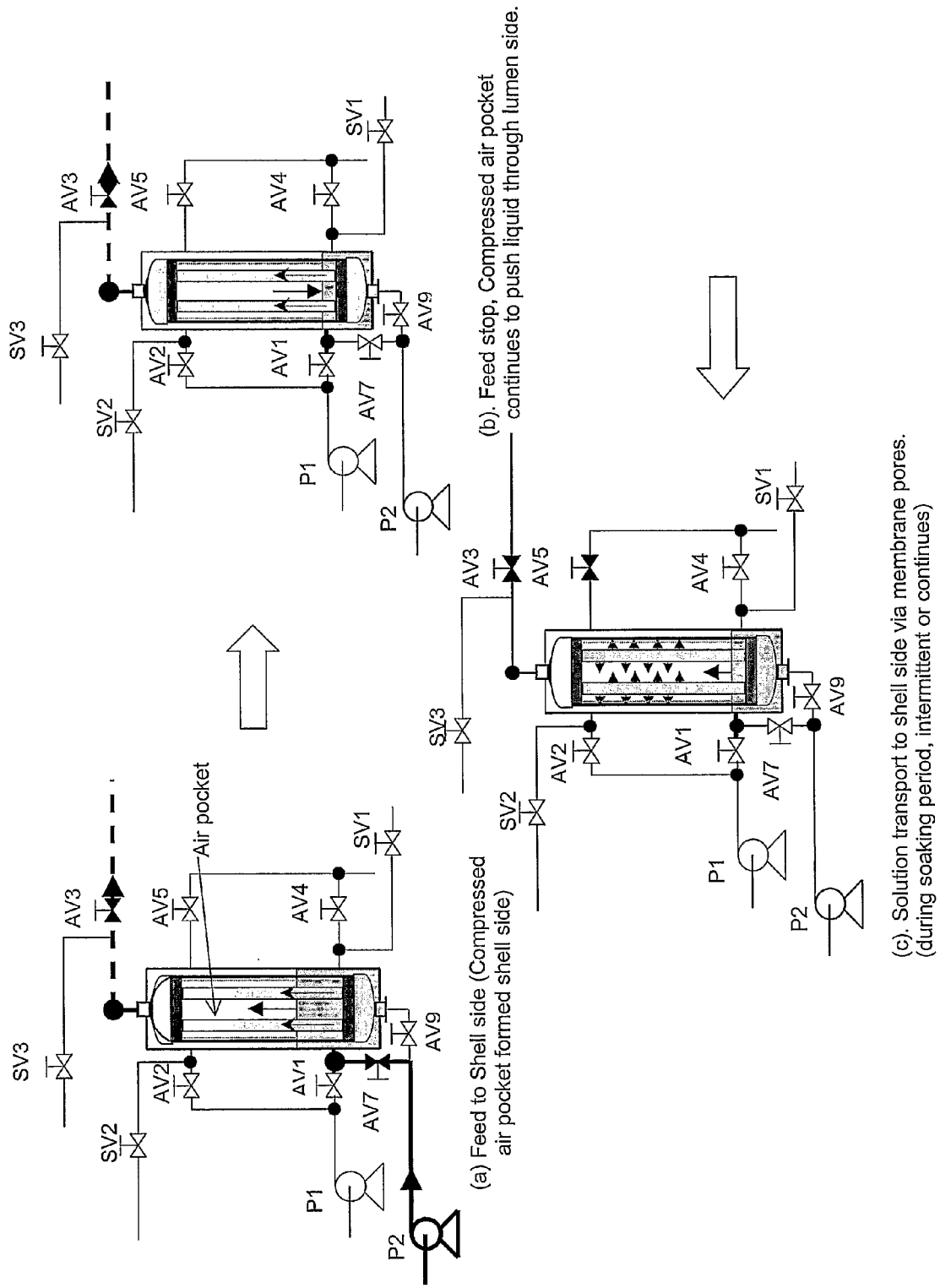
FIG. 1 shows an embodiment of the invention which enables solution delivery to the shell side of a hollow fibre membrane and permeation through to the lumen side.

The invention will be disclosed with reference to hollow fibre polymeric microfiltration and ultrafiltration membranes arranged in bundles and housed in modules, and with reference to maintenance clean for pressurised membrane filtration system with an outside-in filtration mode, however, it will be appreciated that the invention is not limited to such embodiments, and may for example encompass an inside-out filtration mode.

Several maintenance clean (membrane cleaning) protocols involving dosing of the cleaning agent to the shell side or the lumen (filtrate) side were tested and compared. The methods and their performances are discussed below.

Backwash is preferably performed prior to any maintenance clean. In the backwash process of a hollow fibre membrane, for example, a liquid is forced through the membrane from the lumen side, either by gas pressure or pumped by further liquid. As part of the backwash process, the shell side can be either drained, partially drained or filled with liquid during the backwash and prior to any cleaning solution being introduced.

The normal procedure for carrying out a backwash usually involves an initial filtering down or draining down process. Filtering down is the more preferred. Filtering down is, for preference, achieved with compressed air at a pressure below the membrane bubble point entering the shell side as the filtration driving force to push the shell-side liquid through the membrane and into the lumen. Filtering down continues until the shell side liquid level is at least less than half of the shell side liquid holding volume. In the case where no backwash is carried out before the clean, filtering down is carried out as the initial step of the maintenance clean. Preferably the shell side liquid level is down to the lowest level that filtering down with compressed air can achieve, which in most cases is usually just above the lower module potting. Filtering down means the shell side volume is greatly reduced and any maintenance clean solution can thus enter the system without the necessity of draining the shell side. For immersed membrane filtration processes, no compressed air is required to perform filtering down.

Following the drain down or filtering down, a liquid backwash can be carried out, preferably with air scouring. The liquid backwash can be achieved in different ways. The air pushed backwash is preferably used. Compressed air below the membrane bubble point enters the lumen and pushes the filtrate through the membrane in the reverse direction to the filtration direction. Only filtrate retained in the lumen at the end of filtration or filtering down is used for the backwash. Following the backwash, the lumen is empty and ready to receive the chemical cleaning solution.

Membranes requiring maintenance cleaning are usually covered with a layer of fouling materials and some of the membrane pores may also be plugged. Backwashing has the advantage of partially removing pore blockages and the fouling layer enabling cleaning solution to reach a greater percentage of the membrane surface. When maintenance cleaning is used without backwashing, the cleaning solution may preferentially diffuse through the membranes via unblocked pathways which may be present as a result of regions of less fouled membrane surface and unblocked membrane pores. With sufficient air pressure, filtrate in the lumen flows through membrane pores at reasonable velocity and removes some fouling materials on the membrane surface and opens a portion of blocked pores. This enables chemical solutions, when introduced, to reach a greater percentage of membrane pores.

At end of any pre maintenance clean backwash, the shell side liquid can be either drained or retained as part of the backwash process. Because of the reduced shell side liquid volume achieved by prior filtering down, the shell side liquid volume before maintenance clean is generally less than half of the total shell side liquid holding volume even when draindown is removed from the end of the backwash sequence. Drain down of the shell side liquid before maintenance clean is optional.

Alternatively, before maintenance clean, the membrane is not backwashed, but rather the shell side is filtered down or drained down to reduce the shell side volume before the delivery of maintenance clean solution.

Depending on the particular method chosen, the chemical solution is either delivered to the shell side, preferably via the lower CIP (Cleaning-In-Place) manifold or to the filtrate (lumen) side, preferably via the lower filtrate/CIP manifold or both in a sequence.

In the methods of the present invention, the solution flow rate is preferably low (0.1-4 $m^3$/h per module depending on module size) for the lumen side chemical delivery, to minimise the negative transmembrane pressure which may occur during this stage. The maximum cleaning solution volume used in the clean is preferably no more than the lumen volume, shell volume or both (plus any pipe holding or tidal volume) depending on the particular delivery method. This is particularly important for controlling chemical solution consumption.

Cleaning solutions can be delivered by any existing pump connected to the appropriate fluid volumes, such as for example, the plant CIP pump. If the cleaning solution is mainly delivered to the lumen side, the cleaning solution usage is very low. In such cases, the cleaning solution can be stored in a sealed storage tank and compressed gas may be used as a delivery tool to push the solution from the storage tank into the lumens of the hollow fibre membranes. The advantage of this is that if the storage tank is fitted with a fluid level sensor, or if the storage tank volume is similar to the total lumen volume, then control of solution volume delivered to the system can be greatly simplified.

Once cleaning solution is delivered to the system, the CIP pump is stopped or the gas pressure source is removed. Depending on the chemical used in the clean, if desired, the shell side and lumen side may be vented via upper manifolds during the soaking period or periodically vented during the soaking period. When vented, shell side aeration may be used to mix the chemicals and improve the contact between the chemical and the membrane. When the solution is dosed to the filtrate (lumen) side, shell side aeration can be used when the solution diffused through membrane wall and reaches the shell side. The solution diffuses through membrane pores to reach the side where there is little or no liquid or where the concentration of cleaning agent in solution is low.

When both the shell side and lumen side are filled, the chemical cleaning agent diffuses into the membrane pores only through a concentration gradient. Membrane pores are soaked in solution for a period of time, preferably 30 seconds to 20 minutes for a typical maintenance clean, and a longer time is required for a full chemical clean. If desired, the shell side and lumen side may be vented via upper manifolds during the soaking period or periodically vented during the soaking period. Humidity loss due to vaporization in the lumen or shell side is very low and membrane pores are kept wet with cleaning solution.

If desired, a backwash can be carried out to remove the remaining cleaning solution from the system prior resuming filtration.

Method 1: Partly Fill Shell Side of Membrane with Chemical Cleaning Solution

In this method, the chemical solution enters the shell side, preferably via the lower feed manifold. However, the solution enters the shell side with all the shell outlet valves closed, ie in dead-end filtration mode, forcing the cleaning solution to lumen side. If the pressure is not high enough to push the cleaning solution to the permeate side, additional transmembrane pressure can be supplied by injecting compressed gas, as in a pressure filtration process, or by suction, as in an immersed membrane filtration process. The shell side is only partially filled with membrane cleaning solution. The minimum delivery volume of solution to the shell side is slightly more than the lumen volume plus the permeate manifold volume. The consumption of chemical and filtrate of this method is significantly less than that of a conventional clean where the shell side is filled with the chemical solution.

The first step of this method is preferably to backwash and then empty both shell and lumen sides. Cleaning solution enters the shell side via the lower CIP valve. However, because the shell side upper CIP return valve is closed and the lumen CIP return valve is opened, the CIP solution is forced by the shell side pressure to enter lumen side once the CIP solution level in the shell side is above the lower potting level. A compressed air pocket is also formed above shell side liquid level. Depending on the shell side pressure, the CIP pump may only run for short period of time and this enables the pressure from the air pocket to continue to press solution to lumen side. Additional transmembrane pressure may be supplied when necessary. Depending on the mixing of solution prior to entering the shell side, the filtration of membrane cleaning solution may just fill the lumen or be extended to send some solution back to the CIP tank or recirculation pipe loop. Alternatively, the CIP solution can be pushed into the shell side by compressed air eliminating a short running cycle of the CIP pump.

After the lumen side is filled up with the chemical solution, the shell side and lumen side vent valves are then opened to equalise the pressure. After the lumen side pressure is close to the shell side pressure, the shell side vent valve is opened while the lumen side vent valve can be either opened, closed or opened periodically to control the diffusion process. When the lumen side vent valve is opened periodically, the valve is preferably opened briefly during the initial stage of soaking. During the whole soaking period, the lumen side can be vented for 1-10 times, with each time lasting from 1 s to 10 mins. The solution in the lumen side slowly diffuses to through the membrane, and the diffusion process may be aided by static pressure in the lumen side when lumen side vent valve is opened. The membrane is partially soaked in the solution, however capillary effect helps to hold solution within membrane wall.

An optional post-aeration may also be applied. This aeration helps to suspend foulants loosened or removed by solution.

The above fill-lumen and back-diffusion procedure can be repeated when necessary to achieve a higher cleaning efficiency.

An optional post membrane cleaning backwash may also be used after the soak. A full backwash is preferably undertaken, at the end of which the shell side chemical waste is fully discharged. If preferred, membrane cleaning chemical drained from shell side can be reused by draining to CIP tank.

Filtration is then resumed.

Conventional cleaning methods of the prior art will typically involve 1) fully filling the shell side with a chemical solution, 2) filtering the chemical solution through for a short period of time, 3) allowing the membrane to soak and 4) discharging the subsequent chemical waste. Method 1 described above can significantly reduce the chemical and chemical waste volume, typically by more than 50%. The repeated lumen-fill and back-diffusion procedures help to enhance the cleaning efficiency without additional chemical. FIG. 1 shows method 1, with both the shell side and the lumen empty. The shell side is partially filled with cleaning solution and then pressurised so that the liquid passes into the lumen.

Method 2: Fill Permeate Side of Membrane with Chemical Solution while Shell Side at Least Partially Drained/Filtered Down In this method, cleaning solution is delivered to fill the membrane lumen (permeate side) and therefore the chemical and filtrate consumption is very low.

The first step of this protocol is preferably to backwash membrane via the method described above. This leaves the lumen side empty and the shell side either empty or partially empty. The membrane lumen side is then ready for receiving the cleaning solution. In case the membrane lumen side is not empty through backwash, the chemical solution has to be delivered under pressure to displace permeate remained in the membrane lumen.

The lumen is then filled with membrane cleaning solution. The chemical dosing pump or the CIP pump is used to introduce the membrane cleaning solution to the lumen side preferably via lower filtrate/CIP valves and any extra solution can exit the lumen side via upper filtrate/CIP valves returning to the CIP tank. During the chemical delivery, shell side upper CIP valve can be either opened or closed. When the lumens are filled with chemical solution, the shell side vent valve is opened and the lumen side vent valve can be either opened, closed or opened periodically. When the lumen side vent valve is opened periodically, the valve is preferably opened briefly during the initial stage of soaking. During the whole soaking period, lumen side can be vented for 1-10 times and each time last from 5 s to 10 mins. Chemical diffusion occurs until the chemical concentration at lumen and shell sides are equalized.

As shell side is empty or partially empty, part of the solution in the lumen side slowly diffuses through the membrane pores and aided by static pressure in the lumen side when lumen side vent valve is opened. During this process, both shell side and lumen side are partially empty, however the capillary effect helps to hold solution within membrane wall. The process of soaking and diffusion is carried out for a predetermined time, until the membrane is as clean as desired, or until most of the cleaning solution is consumed.

The lumen fill procedure with chemical cleaning solution can be repeated when necessary after the solution in the lumen side is diffused to shell side and consumed. Alternatively solution diffused into shell side can be pushed back to lumen side by applying compressed air to shell side. This can be repeated if necessary.

Figure 2:
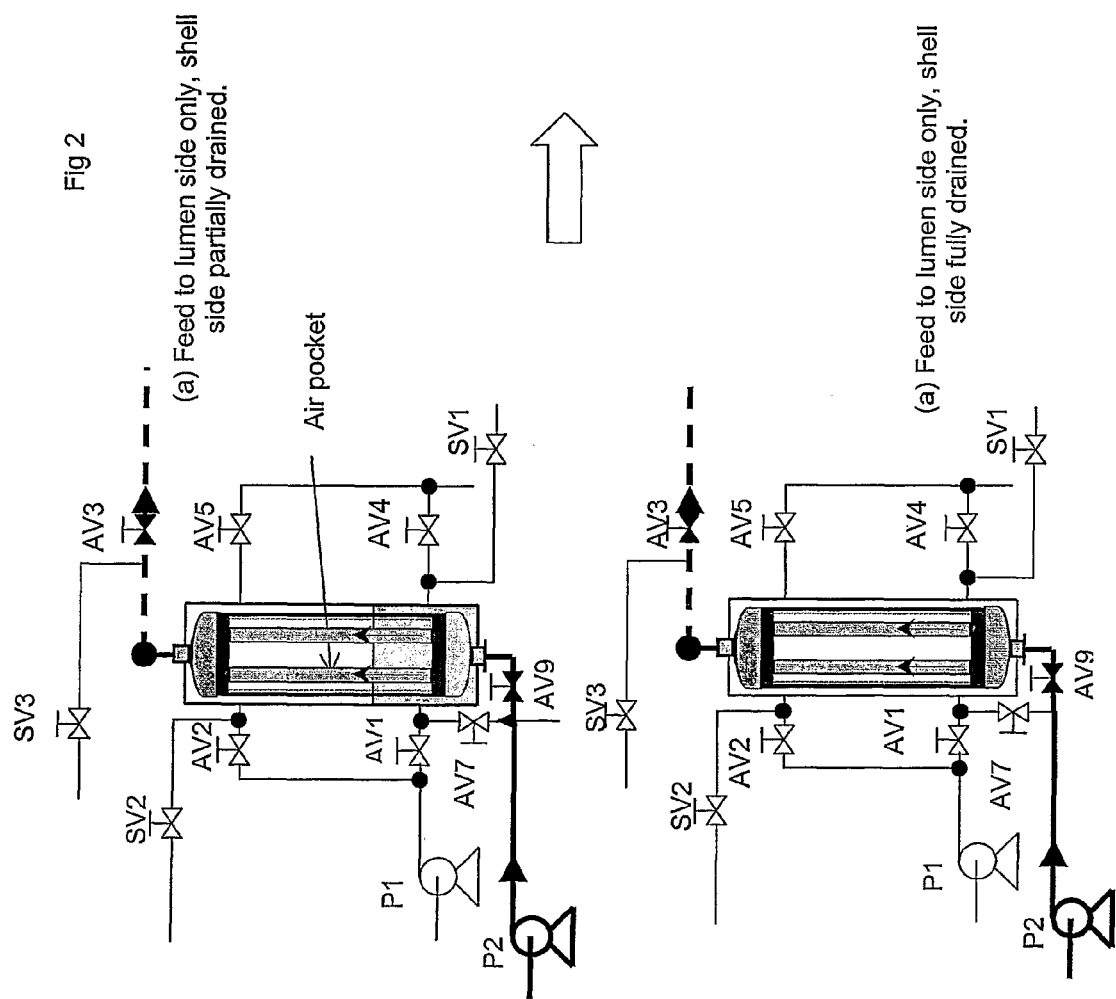
FIG. 2 shows an embodiment of the invention which enables solution delivery to lumen side of a hollow fibre membrane with the shell side at least partially drained/filtered down first.

FIG. 2 shows method 2, solution is introduced to lumen side while shell side is fully or partially drained.

Method 3: Fill Permeate Side of Membrane with Chemical Solution and Shell Side Not Drained This method is similar to Method 2 with the exception that the shell side is not filtered down. If the solid containing water remains on the shell side (tank not drained as in FIG. 3), the chemical solution diffuses through membrane pores to the shell side under concentration gradient and the diffusion rate is comparatively uniform along the membrane module. The diffusion process continues until the chemical concentration on both sides reaches equilibrium.

The lumen fill procedure with chemical cleaning solution can be repeated when necessary after the chemical concentration in the lumen side is reduced to certain level.

An optional post-aeration may also be used. This aeration helps to suspend foulants loosened or removed by solution.

An optional post membrane cleaning backwash may also be used after the soak. A full backwash is preferably utilised, at the end of which the chemical waste is discharged.

Filtration is then resumed.

Figure 3:
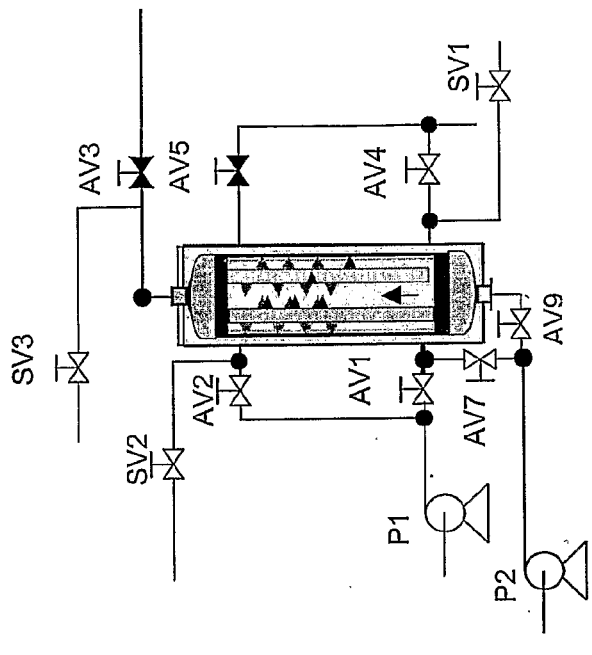
FIG. 3 shows an embodiment of the invention which enables solution delivery to lumen side of a hollow fibre membrane while water containing solid remains on the shell side.
Figure 3:
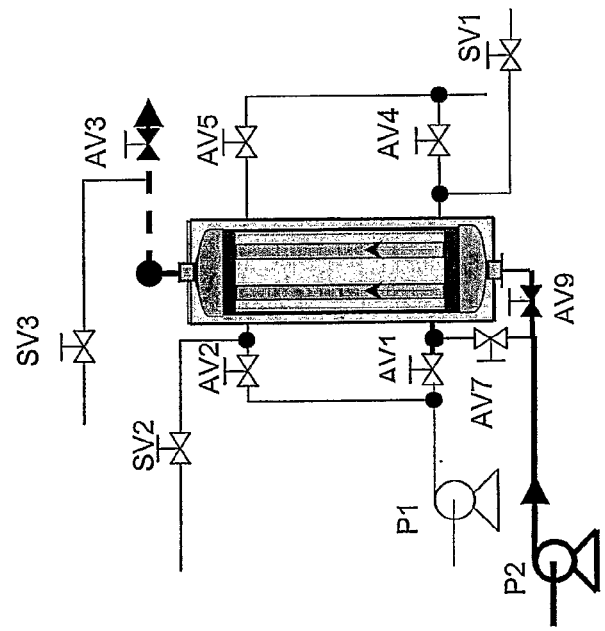

FIG. 3 shows a schematic of method 3. The lumen is filled with water or other fluid and the cleaning solution introduced into the lumen. The cleaning species diffuses through the membrane from a region of higher concentration in the lumen to lower concentration in the shell side.

FIGS. 1-3 shows the piping and instrumentation diagram of various methods.

In the figures, P1 is the feed pump and P2 is the CIP pump. P2 can be substituted by a small solution storage vessel with compressed air inlet on top of the vessel.

SV1 supplies scouring air if aeration is required. SV2 supplies compressed draindown air to assist fast draindown at shell side or filtering down. SV3 supplies compressed liquid backwash air to push filtrate in the lumen through membrane pores in a reverse direction to the filtration direction. AV1 is the lower feed valve and AV2 is upper feed valve. AV4 is the lower shell side drain valve and AV5 is upper shell side return valve In Method 1 shown in FIG. 1, the cleaning solution is delivered to the shell side. The shell side is partly filled with Chemical Solution and the solution is allowed to penetrate to the permeate side under TMP.

When the CIP pump starts to deliver the cleaning solution to the shell side, AV7 and AV3 are opened and AV5 closed. The pressure on the shell side increases slowly, and some chemical solution penetrates to the lumen side under pressure. The chemical delivery stops when the solution level on the shell side reaches between the lower potted head and mid of the module, or membrane lumen is filled up with chemical solution. If the pressure on the shell side is not high enough to push the solution to the lumen side, compressed air can be injected to the shell side via SV2. After soaking for a predetermined period of time, a backwash can be performed to push the remaining chemical solution on the permeate side back to the shell side. It is preferred that compressed air is introduced through SV3 to push the remaining solution in the lumen back to the shell side.

In Methods 2 and 3, the cleaning agent is dosed to the lumen side. During the dosing stage, AV9 and AV3 are both opened, and AV5 on the shell side outlet can be either opened or closed (FIGS. 2 & 3). The chemical delivery stops after the permeate side is filled up with the solution. The chemical solution then penetrates through the membrane pores. In Method 2, the penetration goes on by liquid static pressure and the chemical solution diffuses back to the shell side. The diffusion is only driven by the concentration gradient as the shell side is full (FIG. 3). Again a backwash is preferably to be performed after a period of diffusion.

EXAMPLE

A six-module Memcor CMF-L pilot was used for the comparative tests. The filtration process involves 30 minutes filtration followed by a gas pushed backwash. The recycle repeats several times before maintenance clean is carried out.

Figure 4:
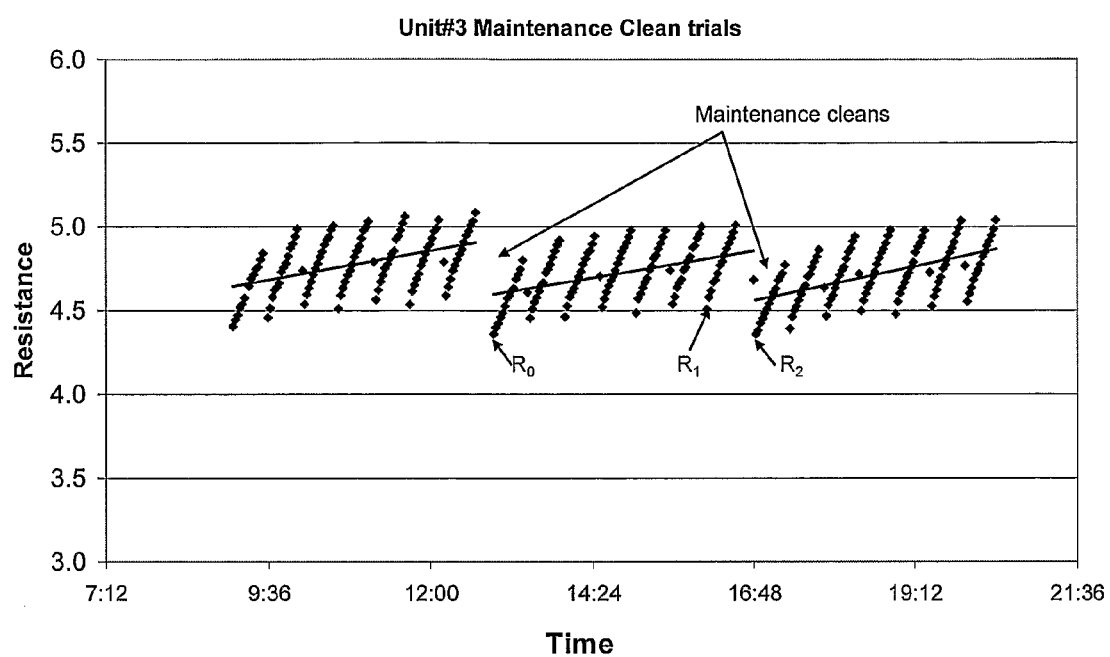
FIG. 4 shows the test profiles of maintenance clean and definition of cleaning efficiency.
Figure 5:
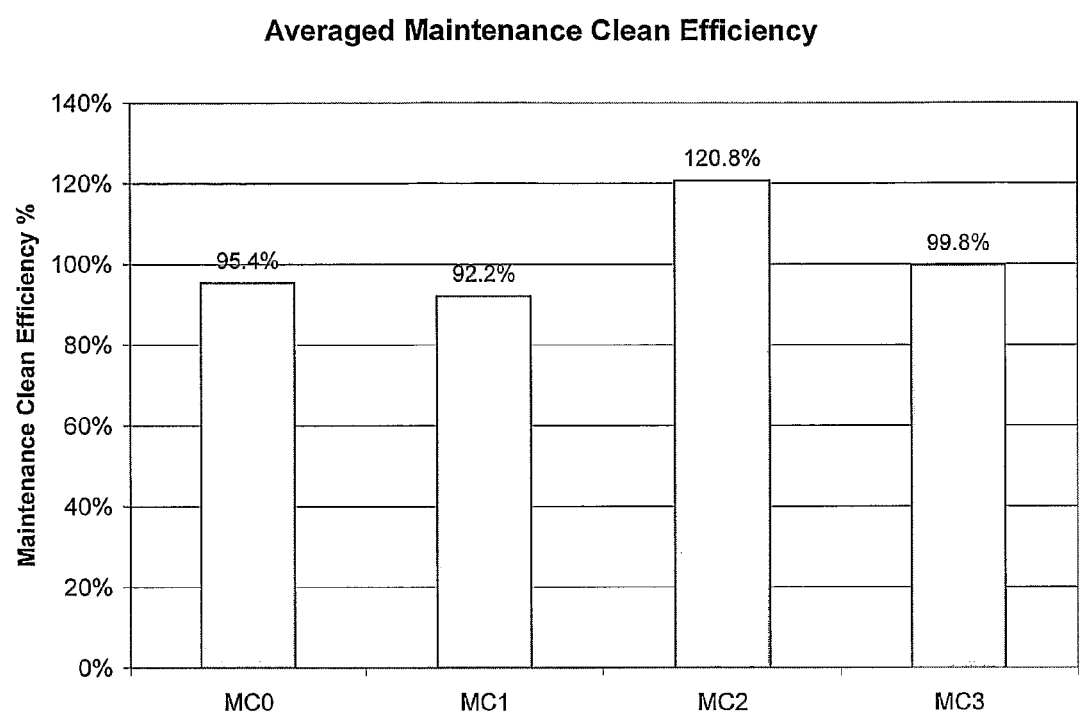
FIG. 5 shows the membrane performance recovery with different tested methods

As shown in FIG. 4, the membrane fouling rate is judged by an increase in the membrane resistance. After filtering for 30 minutes, the membrane resistance rises. The backwash can partially reduce the membrane resistance. However, the backwash did not fully recover the membrane's permeability and the trend of resistance continues to rise. Maintenance clean was performed to further reduce the membrane's resistance and therefore better recover the membrane's permeability. A general trend is depicted in FIG. 4. The efficiency of maintenance clean is defined as:

$$MC\ Efficiency = (R_1 - R_2)/(R_1 - R_0)$$

Where $R_0$ is Resistance straight after the last chemical clean
  $R_1$ is Resistance straight after the last backwash before maintenance clean
  $R_2$ is Resistance after the previous maintenance clean FIG. 5 shows the maintenance clean efficiency with different methods, where:
  MC0—Conventional cleaning method with shell side fully filled of cleaning solution,
  MC1—Method 1 described above, shell side is partially filled of cleaning solution,
  MC2—Method 2 described above with shell side drained and cleaning solution fills permeate side,
  MC3—Method 3 described above without shell side drain and cleaning solution fills permeate side.

Figure 6:
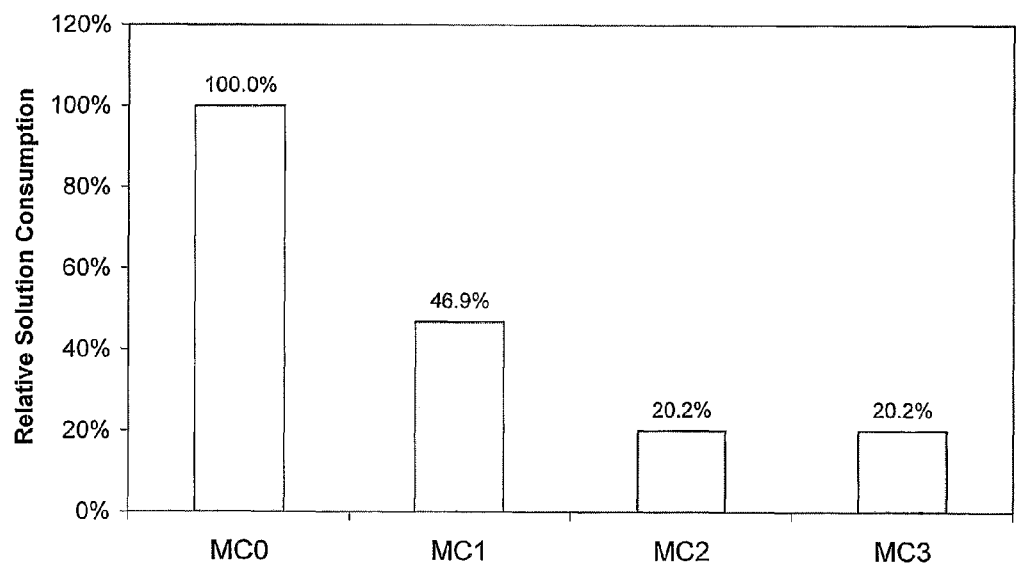
FIG. 6 shows the relative chemical cleaner consumption for a number of cleaning methods.

FIG. 6 illustrates the relative chemical solution consumption compared to the conventional method.

The claims defining the invention are as follows:

1. A method of cleaning a porous polymeric membrane having a feed side and a permeate side comprising:
   providing a liquid on the feed side of the membrane;
   reducing a feed side volume of the liquid by filtration;
   suspending the filtration and the reduction of the feed side volume when the feed side volume is less than half of a feed side liquid holding volume and a level of the liquid is above a lower potting of the membrane;
   introducing a fluid containing a cleaning agent to the permeate side of the membrane subsequent to the suspension of the filtration and the reduction of the feed side volume;
   contacting the permeate side and pores of the membrane with the fluid containing the cleaning agent under static head pressure for a predetermined time of at least 30 seconds;
   removing the fluid containing the cleaning agent from the permeate side of the membrane; and
   resuming filtration.

2. A method of cleaning a hollow fiber porous polymeric membrane having a feed side and a permeate side comprising:
   providing a feed side fluid in contact with the feed side of the membrane;
   introducing a fluid containing a cleaning agent to the permeate side of the membrane;
   contacting the permeate side and the pores of the membrane with the cleaning agent;
   providing for the cleaning agent to diffuse into and through the membrane pores to the feed side fluid, the diffusion of the cleaning agent driven only by a concentration gradient; and
   discharging the fluid containing the cleaning agent.

3. The method of claim 1, further including applying pressure to the fluid containing the cleaning agent on the permeate side of the membrane.

4. The method of claim 3, wherein the pressure is applied in a pulsed fashion.

5. The method of claim 3, wherein the membrane has a bubble point and wherein applying pressure to the fluid containing the cleaning agent comprises applying compressed air at a pressure not more than the membrane's bubble point to the fluid containing the cleaning agent.

6. The method of claim 1, further comprising backwashing the membrane after the suspending of the filtration and the reduction of the feed side volume and before introducing the fluid containing the cleaning agent to the permeate side of the membrane.

7. The method of claim 1, further comprising backwashing the membrane subsequent to removing the fluid containing the cleaning agent and prior to the resumption of filtration.

8. The method of claim 1, wherein the introduction of the fluid containing the cleaning agent to the permeate side of the membrane subsequent to the suspension of the filtration and the reduction of the feed side volume, the contacting of the permeate side and the pores of the membrane with the fluid containing the cleaning agent under static pressure for a predetermined time, and the removal of the fluid containing the cleaning agent from the permeate side of the membrane are repeated in cycles prior to the recommencement of filtration.

9. The method of claim 1, wherein the porous polymeric membrane is part of one of a pressurized membrane filtration and an immersed membrane filtration system.

10. The method of claim 1, wherein the membrane is selected from a microfiltration, ultrafiltration, or nanofiltration membrane.

11. The method of claim 1, wherein the membrane is a flatsheet membrane.

12. The method of claim 1, wherein the membrane is a hollow fiber membrane having a lumen side, the lumen side being the permeate side, and a module or shell side, the module or shell side being the feed side.

13. The method of claim 12, performed upon a plurality of hollow fiber membranes housed inside a module housing.

14. The method of claim 13, wherein the plurality of the membranes is arranged in aligned bundles, creating a plurality of lumen spaces inside the hollow fibers and a contiguous space on the outer or shell side of the hollow fibers and wherein the lumens are arranged so that filtered fluid accumulates therein and is passed from the plurality of lumens into a combined filtration stream.

15. The method of claim 1, wherein the fluid is water.

16. The method of claim 14, wherein the fluid containing the cleaning agent is introduced to the lumens of the hollow fiber membranes.

17. The method of claim 1, wherein the fluid containing the cleaning agent is retained in the permeate side of the membrane without applied pressure.

18. The method of claim 1, wherein the fluid containing the cleaning agent is retained in the permeate side of the membrane with pressure approximately equal to a static head pressure.

19. The method of claim 1, wherein the cleaning agent comprises one of a dissolved oxidative agent and a dissolved reductive agent.

20. The method of claim 1, wherein the predetermined time is sufficient for the cleaning agent to diffuse into the reduced feed side volume of the liquid.

21. The method of claim 20, further comprising pushing the cleaning agent diffused into the reduced feed side volume of the liquid back into the permeate side of the membrane.

22. The method of claim 1, wherein the predetermined time is between 30 seconds and 20 minutes.

23. The method of claim 12, further comprising venting the lumen side of the membrane during the act of contacting the permeate side and pores of the membrane with the fluid containing the cleaning agent.

* * * * *